United States Patent

Weiss

[11] 4,214,240
[45] Jul. 22, 1980

[54] CODED PULSE RADAR FUZE

[75] Inventor: Frank Weiss, Chevy Chase, Md.

[73] Assignee: The United States of America as represented by the Secretary of the Army, Washington, D.C.

[21] Appl. No.: 416,684

[22] Filed: Dec. 3, 1964

[51] Int. Cl.³ .............................................. F42C 13/04
[52] U.S. Cl. .................................. 343/7 PF; 102/214
[58] Field of Search ................ 343/7, 7 PF; 102/70.2, 102/70.2 P, 214

[56] References Cited

U.S. PATENT DOCUMENTS

| | | | |
|---|---|---|---|
| 3,562,752 | 2/1971 | Roeschke | 343/7 PF X |
| 3,945,008 | 3/1976 | Schmucker | 343/7 PF |
| 4,032,918 | 6/1977 | Masin | 343/7 PF |

Primary Examiner—T. H. Tubbesing
Attorney, Agent, or Firm—Nathan Edelberg; Robert P. Gibson; Saul Elbaum

EXEMPLARY CLAIM

1. A coded pulse radar proximity fuze with improved electronic countermeasure protection, comprising:
   (a) transmitting means for radiating a recurring sequence of three pulses of two alternate frequencies at a target, each of said pulses being separated in time by the desired radar round trip delay time and each of said sequences of pulses being separated in time by a greater time than the desired radar round trip delay time;
   (b) means for receiving reflections of said recurring sequence of three pulses radiated at a target by said transmitting means;
   (c) means connected to said receiving means and to said transmitting means for combining the output of said receiving means with a portion of the output of said transmitting means;
   (d) means connected to said combining means for amplifying that portion of the output of said combining means having a frequency equal to the difference between said two alternate frequencies; and
   (e) means connected to said means for amplifying for detecting a sequence of two pulses separated in time by the desired radar round trip delay time.

11 Claims, 17 Drawing Figures

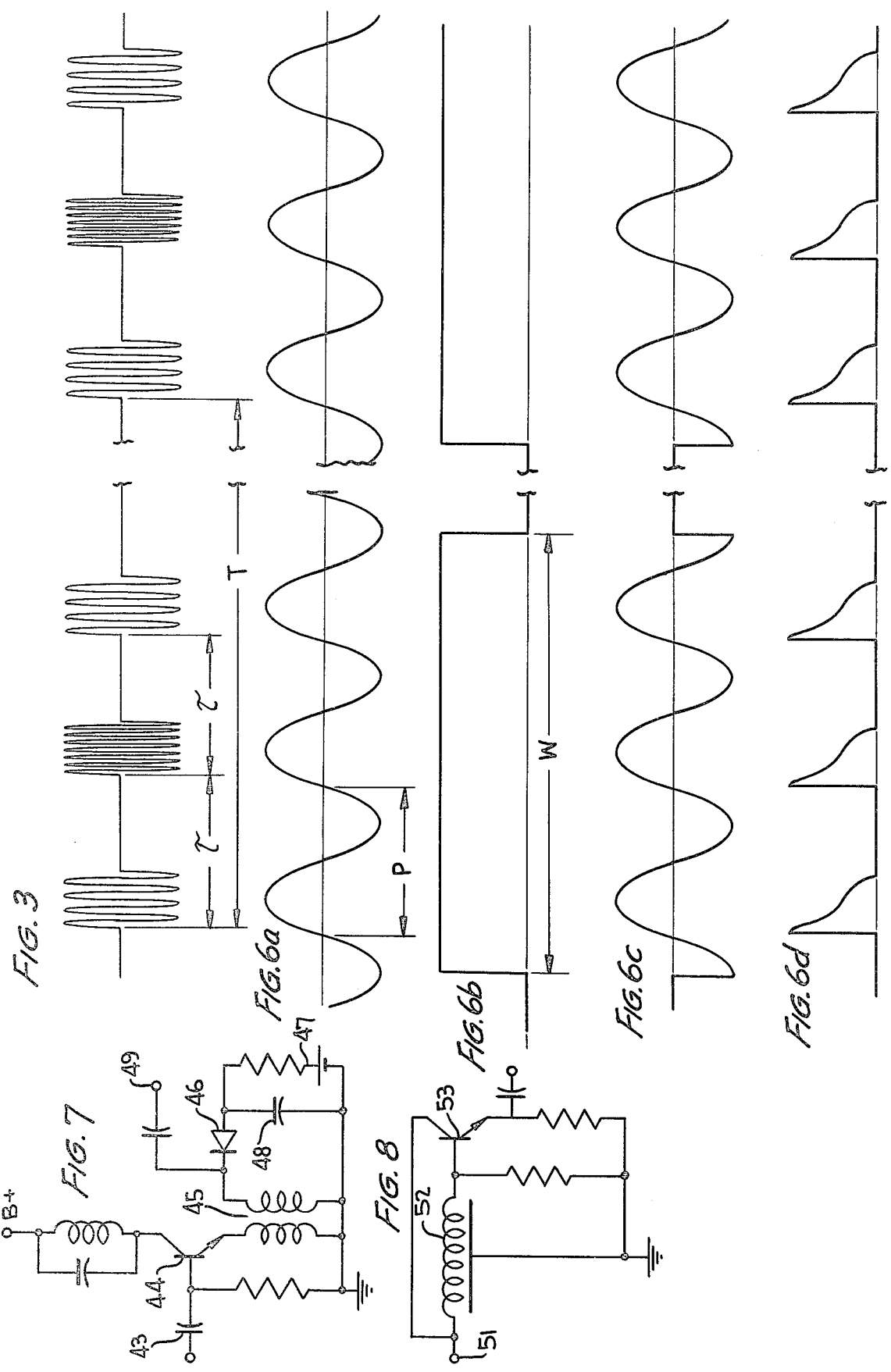

CODED PULSE RADAR FUZE

The invention described herein may be manufactured and used by or for the Government of the United States of America for governmental purposes without the payment to me of any royalty thereon.

This invention relates generally to radar proximity fuzes and more particularly to coded pulse radar proximity fuzes with improved electronic countermeasure protection.

Highly accurate proximity fuze systems can be realized by using short pulse radar distance measuring systems which employ a superheterodyne receiver. In systems of this type, some form of gating at zero time must be used if the local oscillator signal is derived from a CW oscillator. It is also necessary to employ some form of gating in the IF amplifier or the video amplifier in order to insure detonation at the proper range. Unfortunately, gating often enhances certain types of jamming signals commonly encountered in a target area resulting in a desensitization of the fuze.

It is, therefore, an object of the instant invention to provide a radar proximity fuze employing short pulse techniques and which is substantially insensitive to electronic countermeasures.

It is another object of this invention to provide a high resolution radar proximity fuze which is unaffected by CW and swept frequency jamming signals.

It is a further object of the invention to provide a highly accurate radar fuze system with reduced sensitivity to barrage jamming.

According to the present invention, the foregoing and other objects are attained by providing a proximity fuze having a transmitter that generates RF pulses at two different frequencies. Timing circuitry is provided which causes the transmitter to generate a recurring sequence of three pulses of alternate frequencies. The time separation between the three pulses is equal to the desired radar round trip delay time which is directly proportional to the desired radius of explosion. There is also provided a receiver having a mixer and an IF amplifier. The reflected signal is combined with a portion of the signal generated by the transmitter in the mixer to produce a difference frequency which is supplied to the IF amplifier. The IF amplifier is tuned to a frequency which is equal to the difference of the two frequencies generated by the transmitter. Thus, an IF signal will only be produced when a target illuminated by the radar signal is within the desired range. Following the IF amplifier are decision circuits which determine when a true IF signal is produced, i.e. a signal produced by a reflection from a target and not a signal produced by a jamming signal.

The specific nature of the invention, as well as other objects, aspects, uses and advantages thereof, will clearly appear from the following description and from the accompanying drawings in which:

FIG. 3 is a graphical representation of the radiated signals produced by the embodiments shown in FIGS. 1 and 2;

Figure 1:
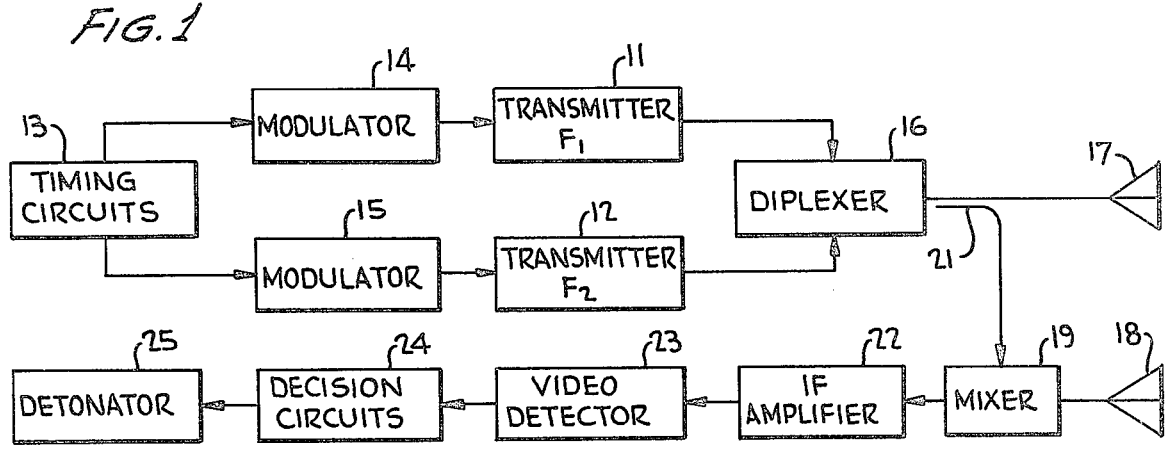
FIG. 1 is a block diagram of one embodiment of the radar proximity fuze according to the invention.
Figure 2:
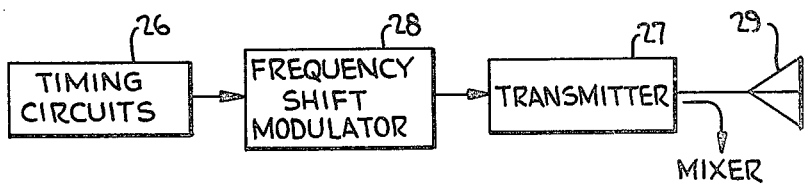
FIG. 2 is a block diagram of a modification of the embodiment shown in FIG. 1 and constitutes a second embodiment of the fuze according to the invention.
Figure 4:
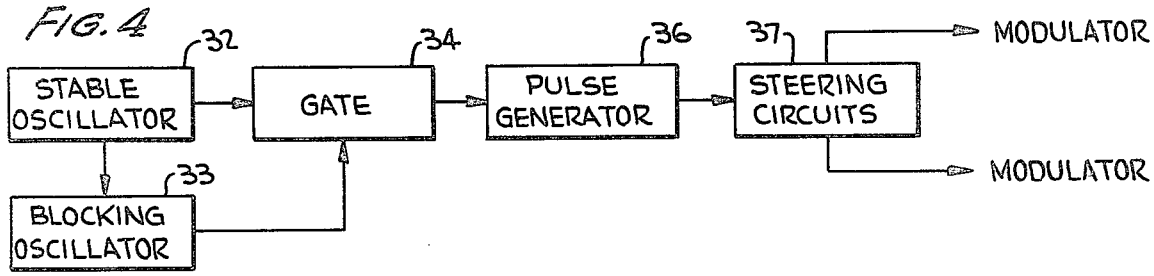
FIG. 4 is a block diagram of the timing circuits used in the radar fuzes shown in FIGS. 1 and 2.
Figure 9:
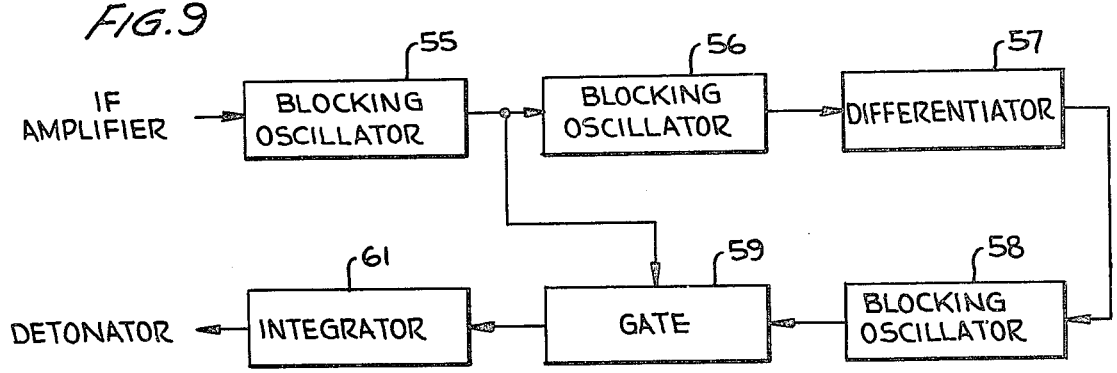
Figure 10A:
Figure 10B:
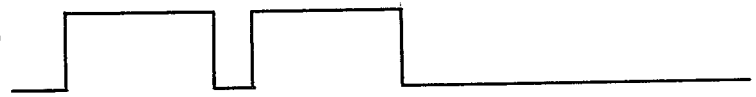
Figure 10C:
Figure 10D:
Figure 11:
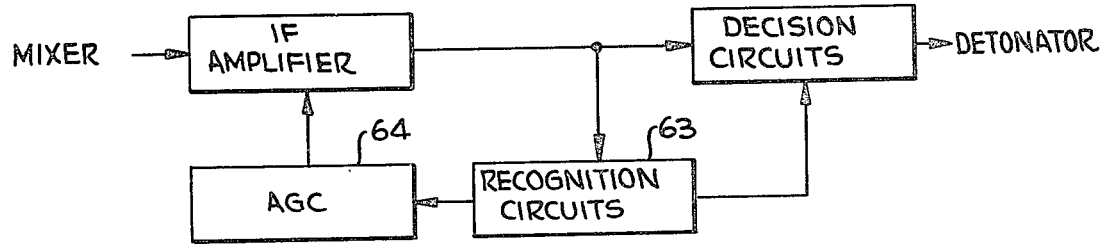

FIGS. 6a, 6b, 6c, and 6d are graphical representations of the signals generated by the timing circuits shown in FIG. 4;

FIG. 7 is a schematic diagram of a pulse generator circuit which may be used in the timing circuits shown in FIG. 4;

FIG. 8 is a schematic diagram of one form the decision circuits used in the embodiments of FIGS. 1 and 2 may take;

FIG. 9 is a block diagram of another form the decision circuits used in the embodiments shown in FIGS. 1 and 2 may take;

FIGS. 10a, 10b, 10c, and 10d are graphical representations of the signals generated by the decision circuits shown in FIG. 9; and FIG. 11 is a block diagram of a modification of the embodiments shown in FIGS. 1 and 2 which decreases the susceptibility of the radar proximity fuze according to the invention to barrage jamming.

Referring now to the drawings and more particularly to FIG. 1 wherein a radar proximity fuze according to the present invention is shown as comprising two transmitters 11 and 12 tuned to generate signals at frequencies $F_1$ and $F_2$, respectively. Timing circuits 13 operate through modulators 14 and 15, respectively, to cause transmitters 11 and 12 to produce a recurring sequence of three very short pulses of alternate frequencies $F_1$ and $F_2$. For example, transmitter 11 might be caused to generate a first pulse having a frequency $F_1$ at a time $t_1$. This pulse would be followed by a pulse having a frequency $F_2$ generated by transmitter 12 at time $t_2$. At time $t_3$ transmitter 11 would be again caused to generate another pulse, the time between times $t_2$ and $t_3$ being equal to the time between times $t_1$ and $t_2$. Each of the three pulses thus produced would have the same pulse width. Alternatively, the sequence might be reversed, i.e. a pulse generated by transmitter 12 followed by pulse generated by transmitter 11 followed by a pulse generated by transmitter 12. The particular sequence is not important to the operation of the invention. In fact, alternating sequences may be generated with equal effect. The sequence of three pulses is caused to be continuously and recurrently generated by the timing circuits 13. The outputs of transmitters 11 and 12 are combined in diplexer 16 and radiated in the direction of a target by antenna 17. Antenna 18 receives reflected signals from the target and supplies them to one input of mixer 19. A portion of the signals generated by transmitters 11 and 12 is derived from junction 21 at the output of diplexer 16 and supplied as the other input to mixer 19. Mixer 19 produces a signal having a frequency which is equal to the difference in the frequencies of the signals supplied by antenna 18 and junction 21. The difference frequency produced by mixer 19 is supplied to the input of IF amplifier 22. IF amplifier 22 is tuned to a frequency which is equal to the difference between the frequency $F_1$ and the frequency $F_2$. Video detector 23 receives the output signal from IF amplifier 22 and provides a pulse output to decision circuits 24 which actuate detonator 25 when the fuze is within the desired radius of explosion.

FIG. 2 shows an alternate structure for generating the required sequence of three pulses of alternate frequency. This structure comprises timing circuits 26 which causes a transmitter 27 which can be operated at either of two frequencies, $F_1$ and $F_2$, to be alternately pulse modulated at the two frequencies by frequency shift modulator 28. The resulting signal radiated by antenna 29 is identical with that radiated by antenna 17 in FIG. 1. The structure and operation of the receiver section (not shown) of the fuze system shown in FIG. 2 is identical with that shown in FIG. 1. The advantage of the system shown in FIG. 2 is a reduction of total components at the expense of a more complex transmitter.

A better understanding of the operation of the fuze systems shown in FIGS. 1 and 2 may be had by reference to FIG. 3 which shows in graphical form a portion of the signal radiated in the direction of a target. More specifically, there is shown, by way of example, two sequences of three pulses of alternate frequency. The time separation between pulses within a sequence is equal to the desired radar round trip delay $\tau$ which is directly proportional to the desired radius of explosion. The repetition rate of sequences of pulses, which is inversely proportional to the time separation T between sequences, is determined by ambiguity range and average power considerations.

With reference again to FIG. 1, it will be appreciated that in the absence of an electronic countermeasures environment the only time that the mixer 19 will produce an output signal that has a frequency equal to the tuned frequency of the IF amplifier 22 is when the target is within the desired range. This is because it is only at this point that a pulse supplied to mixer 19 by the junction 21 will combine with the preceeding reflected pulse supplied to mixer 19 by antenna 18 to produce a difference frequency. In the presence of an electronic countermeasures environment, spurious difference frequency signals may be generated by mixer 19 and amplified by IF amplifier 22; however, the decision circuits 24 serve to distinguish between these spurious or false signals and true signals resulting from reflections from a target within the desired radius of explosion. Consider the following six examples:

(1) No reflected signal and no electronic countermeasure environment: Under these conditions, there will be no resultant IF amplifier signal since the mixer 19 receives only one frequency at a time and no difference frequency is produced.

(2) Target at an undesired range and no electronic countermeasure environment: This will result in an echo having a total propagation time other than $\tau$. This signal will not be coincident with and, therefore, will not beat with the signal derived by junction 21. As a result, no difference frequency is produced by mixer 19, and there is no IF amplifier signal.

(3) Target at the desired range: This condition will result in two IF amplifier pulses separated by $\tau$ since alternate frequency pulses will be coincident at the mixer 19 thus producing two difference frequency pulses equal in frequency to the tuned frequency of IF amplifier 22.

(4) CW jamming at frequency $F_1$ or frequency $F_2$: This will result in a single IF amplifier pulse or a pair of IF amplifier pulses separated by $2\tau$ depending on the order of the fuze transmitter modulation. As will be shown and described later, this condition is easily recognized by the decision circuits, and premature detonation prevented. When the target is within the desired range, the conditions of example 3, supra, will pertain, and detonation will be initiated.

(5) Variable frequency jamming sweeping through a band of frequencies which includes frequency $F_1$ and frequency $F_2$: Here, the sweep frequency of the jamming signal would be considerably less than the fuze pulse repetition rate. This condition can be assured by making the difference in frequencies $F_1$ and $F_2$ large. Thus, at any particular time the jamming signal appears to be a CW signal, and the situation described in example 4, supra, would pertain when the jamming signal is swept through frequency $F_1$ or frequency $F_2$.

(6) Barrage jamming: This will result in three IF amplifier pulses separated by $\tau$. This condition can be readily recognized and a signal may be generated which can be used to control an automatic gain control circuit which would raise the threshold level of the IF amplifier 22 resulting in reduced fuze sensitivity. An echo signal having an amplitude greater than the jamming signal would then, when the target was within the desired range, produce two IF amplifier pulses separated by $\tau$ as in example 3, supra.

The timing circuits may generally take the form shown in FIG. 4. A stable oscillator 32 is employed to produce a signal, shown graphically in FIG. 6a. The period p of the oscillator signal is equal to the desired time separation between pulses as shown in FIG. 3. A blocking oscillator 33 is synchronized with oscillator 32 and produces the waveform shown in FIG. 6b. The synchronization of blocking oscillator 33 is on a subharmonic of the signal generated by oscillator 32. The subharmonic frequency has a period equal to the time separation T of sequences of pulses as shown in FIG. 3. The width of the output pulse generated by blocking oscillator 33 is determined by its recovery time and is chosen to be greater than three times $\tau$ but less than four times $\tau$. The blocking oscillator pulse is applied to coincidence gate 34 to gate the output signal from stable oscillator 32. This results in a signal generally of the form shown graphically in FIG. 6c. This signal is applied to pulse generator 36 which produces a recurring sequence of three pulses having very fast rise times as graphically depicted in FIG. 6d. These pulses are then alternately gated to one or the other of the two modulators in the system shown in FIG. 1. Of course, the steering circuits 37 would not be required in the system shown in FIG. 2.

Figure 5:
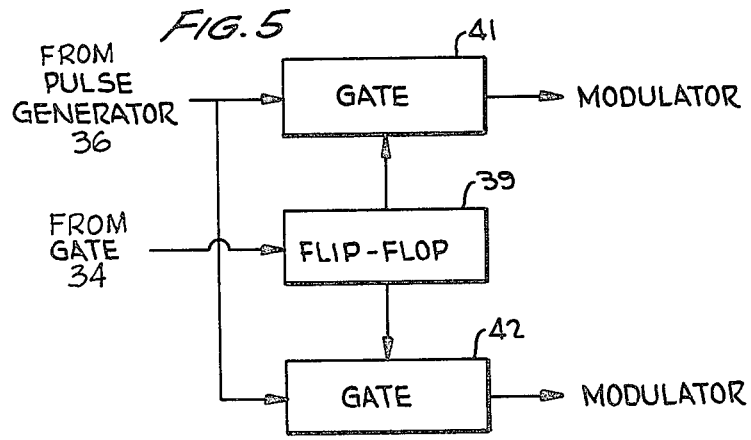
FIG. 5 is a block diagram of one form the steering circuits incorporated in the circuitry shown in FIG. 4 may take.

One possible arrangement for the steering circuits 37 is illustrated in FIG. 5. A square wave generating circuit, here shown as flip-flop 39, receives the output signal from gate 34. Flip-flop 39 generates two square wave signals 180° out of phase in synchronism with the signal from gate 34. One of these square wave signals is applied to coincidence gate 41 while the other is applied to coincidence gate 42. The output of pulse generator 36 is applied to both gates 41 and 42 resulting in alternate pulses being gated to one or the other of the modulators.

The modulators in the system shown in FIG. 1 can be omitted if the transmitters employ self-modulating oscillators of the type disclosed in application Ser. No. 312,791, now U.S. Pat. No. 3,597,705, filed on Sept. 30, 1963, by Frank Weiss and Fabian T. Liss and assigned to the assignee of the instant application. This type of oscillator employs a microwave oscillator tube in a cavity resonator and connected externally as a blocking oscillator. Each time the grid of the oscillator tube is pulsed, the oscillator generates a short pulse having a frequency determined by the cavity resonator. This oscillator permits the use of different steering circuits from those shown in FIG. 5. Instead of gating alternate pulses from pulse generator 36 to one or the other of the transmitter oscillators, all the pulses generated by pulse generator 36 are applied to both transmitter oscillators. The transmitter oscillators are alternately inhibited from oscillating by loading the primary winding of the blocking oscillator transformer. This may be accomplished by connecting a switch across the primary of each blocking oscillator transformer. These switches are alternately gated on by a source of square wave signals as for example a flip-flop connected as in FIG. 5. This technique of triggering the transmitter oscillators has the advantage of directly applying the pulses generated by the pulse generator 36 to the transmitter oscillators. Since there is no circuitry between the pulse generator 36 and the transmitter oscillators, there will be no deterioration of the rise time of the leading edge of the trigger pulses.

A suitable pulse generator which may be used in the timing circuits shown in FIG. 4 is illustrated in FIG. 7. This circuit comprises a transistor 44 connected in emitter follower configuration. The input signal applied to the base of transistor 44 through capacitor 43 is derived from the output of the coincidence gate 34 shown in FIG. 4. The output from the emitter of transistor 44 is coupled by transformer 45 to step-recovery diode 46. Diode 46 is forward biased by a source of DC voltage 47. Capacitor 48 bypasses voltage source 47 to establish the anode of diode 46 at signal ground. The pulse output appearing at terminal 49 is taken from the cathode of diode 46. The operation of step-recovery diodes is described in some detail in an article by Moll, Kraukauer and Shen entitled "P-N Junction Charge-Storage Diodes" which appeared in the January, 1962, issue of the *Proceedings of the IRE*.

The principle requirement of the decision circuits in the fuze systems shown in FIGS. 1 and 2 is to recognize when the IF amplifier produces two output pulses separated by $\tau$. This may be simply done by the circuit shown in FIG. 8. The output of the IF amplifier is applied to the terminal 51 which is connected to the input of delay line 52. Delay line 52 provides a time delay equal to $\tau$. The output of delay line 52 is connected to the base of transistor 53 which is connected in emitter-follower configuration. The collector of transistor 53 is connected to terminal 51. The transistor 53 thus operates as a coincidence gate providing an output only when two pulses separated in time by $\tau$ appear at terminal 51.

A more sophisticated decision circuit is illustrated in FIG. 9. In this circuit the time delay is accomplished electronically by a series of blocking oscillators or monostable multivibrators. In the specific example illustrated, the output signal of the IF amplifier is applied to a first blocking oscillator 55. If a target is in range, the detector output will consist of two video pulses separated in time by $\tau$ as previously explained. When these pulses are applied to blocking oscillator 55, an output signal consisting of two narrow DC pulses separated by time $\tau$ is generated. This signal is illustrated graphically in FIG. 10a. The output of blocking oscillator 55 is applied to blocking oscillator 56. Blocking oscillator 56 is designed to have a recovery time slightly less than $\tau$. The resultant output signal, represented in FIG. 10b, of blocking oscillator 56 consists of two pulses having widths slightly less than $\tau$. Differentiator 57 provides two spiked output pulses, shown diagramatically in FIG. 10c, coincident with the trailing edges of the output pulses of blocking oscillator 56. These spiked output pulses from differentiator 57 are used to trigger blocking oscillator 58 which produces two pulses having somewhat greater widths than the pulses produced by blocking oscillator 55. The output waveform of blocking oscillator 58 is represented in FIG. 10d. Coincidence gate 59 receives the outputs from both blocking oscillator 55 and blocking oscillator 58 and provides a pulse output when, as in the case illustrated, a pulse from blocking oscillator 58 overlaps a pulse from blocking oscillator 55. To assure recognition of a pulse produced by a target, an integrator 61 is connected to the output of gate 59. The integrator 61 may be, for example, a binary counter.

Additional circuitry is required to decrease the chances of premature detonation in a barrage jamming environment. This circuitry is shown in FIG. 11 and includes recognition circuits 63 which receive as an input signal the output of the IF amplifier. The recognition circuits 63 are required to recognize three consecutive IF amplifier pulses separated by $\tau$ and may comprise two circuits similar to that shown in FIG. 8 connected in cascade. The output of the recognition circuits 63 may be used to reset integrator 61 in the decision circuits and to cause automatic gain control circuit 64 to increase the threshold level for amplification in the IF amplifier. This will reduce the noise level due to barrage jamming and permit the recognition of true target echo signals, at the expense of system sensitivity.

Obviously, many modifications and variations of the present invention are possible in the light of the above teachings. For example, a multiple ranging fuze system may be readily constructed by employing multiple IF amplifiers connected in parallel. It is therefore to be understood, that within the scope of the appended claims, the invention may be practiced otherwise than as specifically described.

I claim as my invention:

1. A coded pulse radar proximity fuze with improved electronic countermeasure protection, comprising:
    (a) transmitting means for radiating a recurring sequence of three pulses of two alternate frequencies at a target, each of said pulses being separated in time by the desired radar round trip delay time and each of said sequences of pulses being separated in time by a greater time than the desired radar round trip delay time;
    (b) means for receiving reflections of said recurring sequence of three pulses radiated at a target by said transmitting means;
    (c) means connected to said receiving means and to said transmitting means for combining the output of said receiving means with a portion of the output of said transmitting means;
    (d) means connected to said combining means for amplifying that portion of the output of said combining means having a frequency equal to the difference between said two alternate frequencies; and
    (e) means connected to said means for amplifying for detecting a sequence of two pulses separated in time by the desired radar round trip delay time.

2. A coded pulse radar proximity fuze with improved electronic countermeasure protection as defined in claim 1 wherein said means for detecting comprises:
    (a) delay means connected to said means for amplifying for generating an output corresponding to an input from said means for amplifying but delayed in time by the desired radar round trip delay time; and
    (b) coincidence means connected to said means for amplifying and to said delay means for generating an output when an output from said means for amplifying occurs simultaneously with an output from said delay means.

3. A coded pulse radar proximity fuze with improved electronic countermeasure protection as defined in claim 2 wherein said means for detecting further comprises: means connected to said coincidence means for integrating over a period of time the output of said coincidence means.

4. A coded pulse radar proximity fuze with improved electronic countermeasure protection as defined in claim 2 wherein said delay means comprises: a passive delay line connected between said means for amplifying and said coincidence means.

5. A coded pulse radar proximity fuze with improved electronic countermeasure protection as defined in claim 2 wherein said delay means comprises: pulse generating and wave shaping circuit means connected between said means for amplifying and said coincidence means for generating a pulse output corresponding to an input from said means for amplifying but delayed in time by the desired radar round trip delay time.

6. A coded pulse radar proximity fuze with improved electronic countermeasure protection as defined in claim 3 further comprising:
 (a) recognition means connected to said means for amplifying for recognizing a sequence of three pulses separated in time by the desired radar round trip time and further connected to said means for integrating for resetting said means for integrating upon recognition of said sequence of three pulses; and
 (b) automatic gain control means connected to said recognition means for raising the threshold level for amplification of said means for amplifying.

7. A coded pulse radar proximity fuze with improved electronic countermeasure protection as defined in claim 1 wherein said transmitting means comprises:
 (a) timing means for generating a recurring sequence of three timing pulses, each of said pulses being separated in time by the desired radar round trip time and each of said sequences of pulses being separated in time by a greater time than the desired radar round trip delay time;
 (b) transmitter means for generating a signal to be radiated at a target, said signal having one or the other of two frequencies;
 (c) modulating means connected to said timing means for causing said transmitter means to generate a series of transmitter pulses corresponding in time to said timing pulses, said series of transmitter pulses alternating in frequency between said two frequencies; and
 (d) means for radiating the output of said transmitter means at a target.

8. A coded pulse radar proximity fuze with improved electronic countermeasure protection as defined in claim 7 wherein said timing means comprises:
 (a) a stable oscillator providing an output signal having a period equal to the desired radar round trip delay time;
 (b) first pulse generating means synchronized with said stable oscillator for providing a recurring pulse output, the width of the output pulses being greater than three times the period of the output of said stable oscillator but less than four times the period of the output of said stable oscillator, the repetition rate of the output pulses being less than the reciprocal of four times the period of the output of said stable oscillator;
 (c) coincidence means connected to said stable oscillator and to said pulse generating means for passing the output of said stable oscillator only when said pulse generating means produces a pulse; and
 (d) second pulse generating means connected to receive the output of said stable oscillator passed by said coincidence means for generating a pulse for each complete cycle of the output passed by said coincidence means.

9. A coded pulse radar proximity fuze with improved electronic countermeasure protection as defined in claim 8 wherein said second pulse generating means includes: a step recovery diode circuit connected to receive the output passed by said coincidence means.

10. A coded pulse radar proximity fuze with improved electronic countermeasure protection as defined in claim 9 wherein said transmitter means comprises:
 (a) a first transmitter tuned to a first frequency; and
 (b) a second transmitter tuned to a second frequency.

11. A coded pulse radar proximity fuze with improved electronic countermeasure protection as defined in claim 10 wherein said modulating means comprises:
 (a) a first modulator for modulating said first transmitter;
 (b) a second modulator for modulating said second transmitter; and
 (c) steering circuit means connected to said second pulse generating means for steering alternating pulses to said first and second modulators.

* * * * *